Patented July 12, 1938

2,123,186

UNITED STATES PATENT OFFICE 2,123,186

THIOCYANO-FATTY ACID ESTERS

Albert K. Epstein and Benjamin R. Harris, Chicago, Ill.

No Drawing. Application July 22, 1936, Serial No. 91,910

23 Claims. (Cl. 260—99.10)

Our invention relates to a new class of chemical substances, and more in particular to a new class of chemical substances particularly adapted for use as insecticides and parasiticides and they also possess utility as intermediates in the preparation of other compounds.

One object of our present invention is the provision of a new class of chemical substances.

Another object is the provision of a new class of chemical substances which are in general of relatively simple structure and can be cheaply made in commercial quantities.

Another object is the provision of a class of chemical substances of the character set forth which have particular utility as insecticides and parasiticides, and alone, or in combination with other insecticides, may be dissolved in mineral oils or dispersed or emulsified with oil or oleaginous materials and water.
Another object is the provision of a new class of chemical substances having utility as intermediates in the preparation of other chemical compounds.

Other objects and features of the invention will be apparent from a consideration of the following detailed description.

The substances of our invention are, in general, ester derivatives of thiocyano lower molecular weight fatty acids wherein the group esterified with the thiocyano lower molecular weight fatty acid is an aliphatic polyhydroxy substance containing a lipophile radical with at least eight carbon atoms. The lipophile radical comprises a group of predominantly hydrocarbon characteristics. It may be derived from an oil, fat, wax, fatty acid, alcohol, hydrocarbon, or other predominantly oleaginous material and may include an ether or ester linkage. It possesses a marked affinity for oleaginous materials such as oils and fats and is readily wetted by oils or fats. In certain circumstances there may be more than one thiocyanate group in the lower molecular weight fatty acid radical but in all cases there must be at least one thiocyanate group in the lower molecular weight fatty acid radical. The fatty acid radical with the thiocyanate acid group is of relatively low molecular weight and should contain not more than eight carbons.
Some examples of members of the group of substances which we have discovered are as follows:

(1)
$$H_2C-O-\overset{O}{\underset{\|}{C}}-C_{11}H_{23}$$
$$HC-OH$$
$$H_2C-O-\overset{O}{\underset{\|}{C}}-CH_2-SCN$$

Monolauric acid ester of glycerol thiocyano-acetate (2)
$$H_2C-O-C_{16}H_{33}$$
$$H_2C-O-\overset{O}{\underset{\|}{C}}-CH_2-CH_2-SCN$$

Cetyl ethyleneglycol thiocyano propionate (3)
$$CH_2-O-C_{18}H_{37}$$
$$CH_2-O-\overset{O}{\underset{\|}{C}}-CH_2-CH_2-SCN$$

Mono octodecyl ether of ethylene glycol mono thiocyano-propionate (4)
$$CH_2-O-\overset{O}{\underset{\|}{C}}-C_7H_{15}$$
$$CH-O-C_6H_{13}$$
$$CH_2-O-\overset{O}{\underset{\|}{C}}-CH_2-SCN$$

Mono thiocyano acetate of mono hexyl ether of monocaprylin (5)
$$CH_2-O-\overset{O}{\underset{\|}{C}}-C_{17}H_{35}$$
$$CHOH$$
$$CH_2-O-CH_2-CHOH-CH_2-O-\overset{O}{\underset{\|}{C}}-CH_2-SCN$$

Mono stearic acid ester of diglycerol mono - thiocyano-acetate (6)
$$C_{11}H_{23}-\overset{O}{\underset{\|}{C}}-O-C_2H_4-O-C_2H_4-O-\overset{O}{\underset{\|}{C}}-CH_2-SCN$$

Lauric acid ester of di-ethyleneglycol thiocyano-acetate (7)
$$CH_2-O-\overset{O}{\underset{\|}{C}}-C_{17}H_{33}$$
$$CH-O-\overset{O}{\underset{\|}{C}}-CH_2-SCN$$
$$CH_2-O-\overset{O}{\underset{\|}{C}}-C_{17}H_{33}$$

Di-oleic acid ester of glycerol thiocyano-acetate (8)
$$H_2C-O-\overset{O}{\underset{\|}{C}}-C_{15}H_{31}$$
$$HC-OH$$
$$H_2C-O-\overset{O}{\underset{\|}{C}}-CH-CH_2-CH_3$$
$$\qquad\qquad\qquad\; SCN$$

Monopalmitic acid ester of glycerolthiocyano-butyrate (9) Monopalmitic acid ester of ethyleneglycol thiocyano-propionate $$H_2C-O-\overset{O}{\underset{}{C}}-C_{15}H_{31}$$
$$H_2C-O-\overset{O}{\underset{}{C}}-CH-SCN$$
$$\phantom{H_2C-O-C-}CH_3$$

(10) Mono oleic acid ester of glycerol dithiocyano-acetate $$H_2C-O-\overset{O}{\underset{}{C}}-C_{17}H_{33}$$
$$HC-O-\overset{O}{\underset{}{C}}-CH_2-SCN$$
$$H_2C-O-\overset{O}{\underset{}{C}}-CH_2-SCN$$

(11) Mono-melissic acid ester of sorbitol mono-thiocyano acetate $$H_2C-CH-CH-CH-CH-CH_2-O-\overset{O}{\underset{}{C}}-CH_2-SCN$$
$$\phantom{H_2}|\phantom{C-CH-CH-C}|\phantom{H-CH}|$$
$$O=\overset{}{C}-C_{30}H_{61}\phantom{xxx}OH$$

(12) Palmitic acid ester of trimethylene glycol thiocyano-acetate $$H_2C-O-\overset{O}{\underset{}{C}}-C_{15}H_{31}$$
$$CH_2$$
$$H_2C-O-\overset{O}{\underset{}{C}}-CH_2-SCN$$

(13) α-stearyl, β-benzoyl, α' thiocyanoacetyl glycerol $$H_2C-O-\overset{O}{\underset{}{C}}-C_{17}H_{35}$$
$$HC-O-\overset{O}{\underset{}{C}}-\bigcirc$$
$$H_2C-O-\overset{O}{\underset{}{C}}-CH_2-SCN$$

(14) Mono-palmitic acid ester of tartaric acid mono thiocyano-acetate $$O-\overset{O}{\underset{}{C}}-C_{15}H_{31}$$
$$CH-COOH$$
$$CH-COOH$$
$$O-\overset{O}{\underset{}{C}}-CH_2-SCN$$

(15) α-stearyl, β-(p-sulphethoxy) benzoyl, α'-thiocyanopropionyl glycerol $$H_2C-O-\overset{O}{\underset{}{C}}-C_{17}H_{35}$$
$$HC-O-\overset{O}{\underset{}{C}}-\bigcirc-\overset{O}{\underset{O}{S}}-OC_2H_5$$
$$H_2C-O-\overset{O}{\underset{}{C}}-CH-CH_3$$
$$\phantom{H_2C-O-C-CH-}SCN$$

(16) Monothiocyano-caproate acid ester of glycerol monostearate $$CH_2-O-\overset{O}{\underset{}{C}}-C_{17}H_{35}$$
$$CHOH$$
$$CH_2-O-\overset{O}{\underset{}{C}}-(CH_2)_4-CH_2-SCN$$

(17) Mono-stearic acid ester of glycerol thiocyano-acetate $$CH_2-O-\overset{O}{\underset{}{C}}-C_{17}H_{35}$$
$$CH-OH$$
$$CH_2-O-\overset{O}{\underset{}{C}}-CH_2-SCN$$

(18) Stearic acid ester of ethylene glycol 3,5 dithiocyano-benzoate $$C_{17}H_{35}-\overset{O}{\underset{}{C}}-O-CH_2-CH_2-O-\overset{O}{\underset{}{C}}-\bigcirc\genfrac{}{}{0pt}{}{SCN}{SCN}$$

(19) Mono thiocyano caprylic acid ester of diethylene glycol myristate $$CH_2-CH_2-O-\overset{O}{\underset{}{C}}-C_{13}H_{27}$$
$$CH_2-CH_2-O-\overset{}{C}-(CH_2)_6-CH_2-SCN$$
$$\phantom{CH_2-CH_2-O-}\overset{}{O}$$

(20) Cetyl thiocyano-acetate
$$C_{16}H_{33}-O-\overset{O}{\underset{}{C}}-CH_2-SCN$$

(21) Mono-lauryl ether of glycerol mono thiocyano-acetate
$$CH_2-O-C_{12}H_{25}$$
$$CHOH$$
$$CH_2-O-\overset{O}{\underset{}{C}}-CH_2-SCN$$

(22) Stearic acid ester of diethylene glycol thiocyano-acetate
$$CH_2-O-\overset{O}{\underset{}{C}}-C_{17}H_{35}$$
$$CH_2-O-CH_2-CH_2-O-\overset{O}{\underset{}{C}}-CH_2-SCN$$

(23) Oleic acid ester of diethylene glycol thiocyano-acetate
$$CH_2-O-\overset{O}{\underset{}{C}}-C_{17}H_{33}$$
$$CH_2-O-CH_2-CH_2-O-\overset{O}{\underset{}{C}}-CH_2-SCN$$

(24) Mono caprylic acid ester of diethylene glycol thiocyano-acetate
$$CH_2-CH_2-O-\overset{O}{\underset{}{C}}-C_7H_{15}$$
$$CH_2-CH_2-O-\overset{O}{\underset{}{C}}-CH_2-SCN$$

(25) Oleyl thiocyano-acetate
$$C_{18}H_{35}-O-\overset{O}{\underset{}{C}}-CH_2-SCN$$

(26) Mono-oleic acid ester of sucrose mono thiocyano-butyrate

(27) Mono-lauric acid ester of mucic acid mono-thiocyanopropionate

It will, of course, be understood that while the compounds mentioned above are individual, pure compounds, it is contemplated that such may, if desired, be prepared and effectively employed in commercial practice, particularly for insecticidal purposes, in the form of impure reaction mixtures. It will also be appreciated that mixtures of two or more of said compounds, in the pure or impure state, can also be utilized.

Generally speaking, we may select many different types of compounds as lipophile groups, principally compounds having lipophile radicals of relatively high molecular weight, which are linked to the thiocyano lower fatty acid radical through the aliphatic polyhydroxy substance. For example, the following materials may be utilized as sources of lipophile groups: Hydro-aromatic acids such as naphthenic acid, abietic acid, hydroxy aromatic acids such as hydroxy benzoic acid, saturated and unsaturated higher aliphatic acids such as the higher fatty acids and including melissic acid, stearic acid, oleic acid, ricinoleic acid, linoleic acid, mixed fatty acids derived from animal or vegetable sources, for example, lard, cocoanut oil, sesame oil, corn oil, cottonseed oil, sardine oil, partially or completely hydrogenated animal and vegetable oils such as those mentioned, fatty acids derived from various waxes such as beeswax, spermaceti and carnauba wax, lauric acid, octanoic acid, palmitic acid, decanoic acid, myristic acid, hydro-aromatic alcohols such as abietol, unsaturated higher all-cyclic alcohols such as the sterols, for example, cholesterol, higher unsaturated aliphatic alcohols containing at least eight and preferably from twelve to eighteen carbon atoms and even more, such as oleyl alcohol, cetyl alcohol, stearyl alcohol, myristyl alcohol, ricinoleyl alcohol, palmitoleyl alcohol, dodecenol, octyl alcohol, sperm oil alcohols, and other substances with marked affinity for oils and fats. The alcohols may be prepared in any of several methods known to those skilled in the art. For example, the higher unsaturated aliphatic alcohols can be prepared by the Bouveault method or by the catalytic reduction of higher fatty acids.

As is apparent from the examples which we have listed above, the polyhydroxy substances which provide the linkage between the lipophile group and the thiocyano lower molecular weight fatty acid radical may be selected from a large class and include glycerol, glycols such as ethylene glycol, propylene glycol, trimethylene glycol, butylene glycol and the like, polyglycols such as diethylene glycol, poly-glycerols such as diglycerol, triglycerol, tetraglycerol and the like including mixtures thereof, sugars such as sucrose, dextrose, xylose, galactose, fructose, maltose, mannose and the like, sugar alcohols such as arabitol, mannitol, sorbitol and dulcitol, and polyhydroxycarboxylic acids such as tartaric acid, mucic acid, saccharic acid, gluconic acid, glucuronic acid, gulonic acid, mannonic acid, trihydroxyglutaric acid, glyceric acid, and others of the same general character. We include also the carboxylic oxidation products of polyglycerols which may be represented by the following formulae:

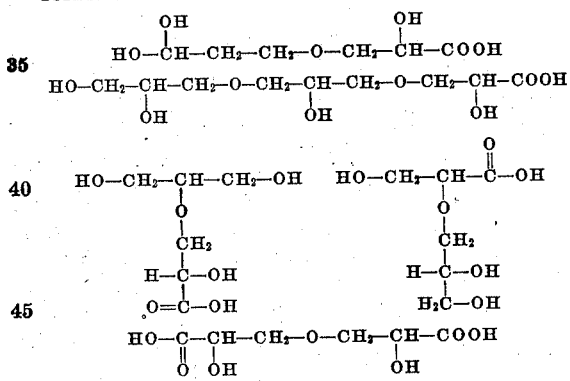

From a study of the compounds which we list hereinabove, those skilled in the art will understand that we may use many different expedients for forming the compounds. Ester or ether linkages are utilized between the aliphatic polyhydroxy and the lipophile portions of the compound, and the skilled chemist will understand in general the most approved practices in securing this result. Various methods are also available for the introduction of the thiocyanate group.

The following examples are illustrative of the manner of producing some of the compounds of our invention and serve as a guide for those skilled in the art to produce other similar compounds described herein.

Example I

*Mono stearate of glycerol thiocyano-acetate*

21 grams of mono stearin chloracetate and 9 grams of potassium thiocyanate are dissolved in 100 cc. of 95% alcohol and the mixture is boiled on the water bath for approximately 15 minutes under reflux. The reaction mixture is then poured into about 500 cc. of hot water, the mass is thoroughly stirred, and from 2% to 3% of salt is added. The oily layer which is formed is removed in any suitable manner and is washed twice with a 2% or 3% salt solution. The product is then taken up with ether and the ether solution is then dried with anhydrous sodium sulphate, subsequently filtered and evaporated to dryness. A soft white product is obtained which, on analysis, shows about 85% purity.

Example II

*Thiocyano-acetates of mixed cocoanut mono fatty acid esters of glycerol*

This product is prepared in the same manner as in the case of the product of Example I, utilizing 20 grams of the chloracetate of the mixed cocoanut mono fatty acid esters of glycerol, 5 grams of potassium thiocyanate and 40 cc. of 95% alcohol. The resulting product is a dark reddish liquid.

Example III

*Mono oleate of diethylene glycol thiocyano-acetate*

In producing this product the same general procedure outlined in Example I is followed, the ingredients being employed in the proportions of 20 grams of the mono oleate of diethylene glycol chloracetate, 6 grams of potassium thiocyanate and 25 cc. of 95% alcohol.

Example IV

*Dilaurin thiocyano-acetate*

15 grams of dilaurin chloracetate are dissolved in 50 cc. of 95% alcohol and the solution is mixed with 2 and ½ grams of potassium thiocyanate in alcohol. The mixture is refluxed for 15 minutes at the boiling point thereof. The reaction product is then cooled, dissolved in about 100 cc. of ether, decanted from insoluble material, and washed several times with a 3% salt solution. The ether solution is then dried with anhydrous sodium sulphate, the mass is filtered and the ether evaporated. A light colored substance, melting at body temperature, is obtained.

Example V

*Cetyl thiocyano-acetate*

To 10 grams of cetyl chloracetate dissolved in 50 cc. of 95% alcohol is added 5 grams of potassium thiocyanate dissolved in 30 cc. of 95% alcohol. The mixture is heated for about ½ hour at the boiling point under reflux. The alcohol is then removed by evaporation on the water bath. Approximately 50 cc. of ether are then added and the ether solution washed three times with 200 cc. of a 3% to 4% salt solution. The washed ether solution is then dried with anhydrous sodium sulphate, filtered and evaporated to dryness. A crystalline residue is obtained which contains cetyl thiocyano-acetate. The product thus obtained can, if desired, be purified by recrystallization. To this end, it is dissolved in 80% alcohol solution and the solution is chilled in ice and filtered. The crystals thus obtained are re-crystallized several times and then dried in vacuum. The resulting crystals are colorless, odorless leaflets and have a melting point of about 42 degrees C. The compound is soluble in ether, chloroform, benzol, petroleum ether, acetone and is quite soluble in alcohol. For use in insecticidal preparations, it is unnecessary that the product be purified. For actual use, the first group of crystals may be employed or, for that matter, even the crude reaction mixture has marked efficacy.

Example VI

Cholesterol thiocyano-acetate 5 grams of cholesterol chloracetate are suspended in 50 cc. of 95% alcohol. To this suspension is added 1 and ½ grams of potassium thiocyanate dissolved in 25 cc. of 95% alcohol and the mixture is heated on the water bath for about ½ hour at the boiling point under reflux, with shaking at intervals. After the reaction is completed, the mixture is cooled and 75 cc. of ether are added. The ether solution is decanted from insoluble material and washed in the same manner as in the case of Example V. The ether solution is then dried with anhydrous sodium sulphate, filtered and evaporated to dryness. In this case, as in the case of cetyl thiocyano-acetate, a crystalline compound is obtained and this may, if desired, be purified by several re-crystallizations from 95% alcohol and may then be dried in vacuum. The resulting compound is white and odorless and crystallizes in leaflets having a melting point of about 132 degrees C. It is soluble in the same solvents as the cetyl thiocyano-acetate.

Example VII

Myristyl thiocyano-acetate

This compound, which is a white solid, is prepared in the same general manner as described in the preparation of cholesterol thiocyanate, utilizing the ingredients in the proportions of 5 grams of myristyl chloracetate, 1.7 grams of potassium thiocyanate and 50 cc. of 95% alcohol.

Example VIII

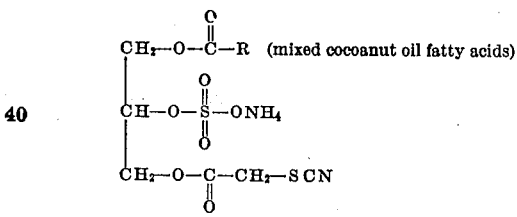

5 grams of mono ester of the thiocyano-acetate, prepared in accordance with Example II, are dissolved in 15 cc. of ethylene dichloride and the mixture is slowly reacted with 1.4 grams of chlorsulphonic acid mixed with 10 cc. of ethylene dichloride, maintaining a temperature of 10 degrees C. When the reaction is completed, the product is neutralized with anhydrous ammonia and the solvent is evaporated.

The thiocyano lower fatty acid esters of the higher ether derivatives of the aliphatic polyhydroxy substances may be prepared in like manner. The higher ether derivatives of glycerin, glycols and the other polyhydroxy substances may be prepared in any known way, as, for example, by reacting glycerin mono-chlorhydrin with the sodium compound of the higher aliphatic alcohols such as lauryl alcohol, myristyl alcohol, oleyl alcohol and the like. The resulting higher ether derivatives of the polyhydroxy substances may then be converted into the bromacetate, chloracetate or the like by reaction with bromacetyl bromide or with chlor acetyl chloride. This compound may then be reacted with potassium or sodium thiocyanate to produce the thiocyano-acetates as described hereinabove.

While, in each of the examples noted above, chloracetate derivative has been employed, it is obvious that the bromacetate derivatives may similarly be utilized. Furthermore, it is evident that the chlor- and brom-propionates, butyrates, and the like may be employed in producing the compounds which are similar to those specifically described. Likewise, in place of potassium thiocyanate, ammonium, sodium, calcium or other alkali or alkaline earth thiocyanates may be employed.

Other methods of preparation, well known to those skilled in the art, may be adapted to the preparation of the compounds of our invention.

While we have described hereinabove thiocyano lower fatty acid esters of higher straight chain aliphatic alcohols, such as cetyl thiocyano-acetate, we have found that our most satisfactory compounds are those which are derived from aliphatic polyhydroxy substances in which the hydrogen of one or more hydroxyl groups is replaced by a higher alkyl or acyl radical and the hydrogen of at least one hydroxyl group is replaced by a thiocyano lower fatty acid group. In this latter category, compounds wherein the linkage between the aliphatic polyhydroxy substances and the lipophile group is an ester linkage appear to be particularly advantageous both from the standpoint of efficacy as insecticides as well as with regard to the ease of preparation and the like.

The polyhydroxy substances which are the linking substances between the lipophile group or groups and the thiocyano-carboxylic acid group may be conveniently considered as falling into two classes. The first of these classes includes compounds containing only two esterifiable hydroxy groups and is exemplified by glycols such as ethylene glycol and polyglycols such as diethyleneglycol. The second class contains those substances which have at least three esterifiable hydroxy groups, examples of which are glycerin, polyglycerols such as di- and tri-glycerol, sugars, sugar alcohols, etc. It will be understood that our compounds may have one or more lipophile radicals and one or more thiocyano-carboxylic acid groups attached to the polyhydroxy substance.

The compounds of our invention, as described above, are particularly effective as insecticides and parasiticides and are notably innocuous to foliage. They are especially useful as contact insecticides for combating boring and sucking insects.

In practice, it is convenient to disperse the thiocyanate substances in aqueous media by means of emulsifying agents such as soaps or other interface modifiers and their effectiveness may be enhanced by incorporating therewith, in the emulsion, interface modifiers with spreading and penetrating characteristics. Generally speaking, concentrations of about 1 to 1000 and 1 to 3000, depending upon the susceptibility of the insect and the potency of the substance, are usually effective for practical use.

The thiocyanate substances of our invention can be distributed as such, as solutions in organic solvents, preferably more or less concentrated, as concentrated emulsions, or, if desired, in the form of the ultimate emulsions ready for use. In general, the substances of our invention are readily soluble or miscible with oleaginous materials such as mineral oils, vegetable oils and the like.

Our compounds may also be used, as indicated above, as intermediates in the preparation of other substances. For example, they may be, treated with oxidizing agents such as dilute nitric acid to form sulphonic acid derivatives which have utility as wetting, penetrating, frothing, and interface modifying agents in the textile and in numerous other fields. Our compounds are also useful in the preparation of thiazoles, disulphides, dithiourea derivatives, and the like.

While, in general, our compounds are of the nature described in the numerous examples set forth hereinabove, they may, for some purposes, contain other groups such as sulphate or phosphate groups, as for example, illustrated in Example VIII. The presence of such groups as sulphates or phosphates tends to increase the water solubility or dispersibility of the compounds. The sulpate or phosphate groups may be attached at a double bond of the fatty acid radical of the polyhydroxy derivative or through an hydroxy group of the polyhydroxy substance. The hydrogen of the sulphate or phosphate group may be replaced in whole or in part by inorganic or organic cations such as sodium, potassium, ammonium, amines, alkylol-amines, quaternary ammonium bases, etc.

In so far as the thiocyano-fatty acid group is concerned, we may employ a thiocyano-acetate, thiocyano butyrate, or other similar groups containing not more than eight carbon atoms and including a thiocyanic acid radical. In general, however, we have found that the thiocyano-acetates particularly produce compounds of exceptionally valuable characteristics and they have the advantage of being relatively inexpensively produced from commercially available substances.

Wherever the term "higher" is used in the claims, it will be understood to cover at least eight carbon atoms unless otherwise qualified. Concomitantly, wherever the term "low" or "relatively lower" is used in the claims, it will be understood to cover less than 8 carbon atoms unless otherwise qualified.

Wherever the term "thiocyano-acetate radical" or "thiocyano-acetic acid radical" is employed in the claims, it will be understood to mean the radical having the formula $$-O-\underset{\underset{O}{\|}}{C}-CH_2-SCN$$

What we claim as new and desire to protect by Letters Patent of the United States is:

1. A chemical compound in the form of a thiocyano-acetic acid ester of an aliphatic polyhydric alcohol and corresponding to the formula

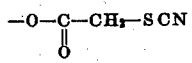

wherein R is the aliphatic polyhydric alcohol radical in which the hydrogen of one hydroxyl group is substituted by a higher molecular weight lipophile radical.

2. A chemical compound in the form of a thiocyano-acetic acid ester of a glycol and corresponding to the formula

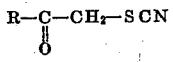

wherein R is the glycol radical in which the hydrogen of one hydroxyl group is substituted by a higher molecular weight lipophile radical.

3. A thiocyano-acetate of an aliphatic polyhydric alcohol wherein the hydrogen of one hydroxyl group of the polyhydric alcohol is substituted by a higher molecular weight aliphatic radical of the group consisting of alkyl and acyl radicals.

4. A thiocyano-acetate of an aliphatic trihydric alcohol wherein the hydrogen of one hydroxyl group of the tri-hydric alcohol is substituted by a higher molecular weight aliphatic radical of the group consisting of alkyl and acyl radicals.

5. A thiocyano-acetate of a lower molecular weight polyhydric alcohol wherein the hydrogen of one hydroxyl group of the polyhydric alcohol is substituted by a higher molecular weight lipophile radical.

6. A thiocyano-acetate of a lower molecular weight tri-hydric alcohol wherein the hydrogen of one hydroxyl group of the tri-hydric alcohol is substituted by a straight chain higher molecular weight aliphatic radical of the group consisting of alkyl and acyl radicals.

7. A thiocyano-acetate of a glycol wherein the hydrogen of one hydroxyl group of the glycol is substituted by a straight chain higher molecular weight acyl radical.

8. A derivative of a lower molecular weight polyhydric alcohol, in which the hydrogen of only one hydroxyl group is substituted by the group

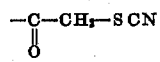

and a hydrogen of only one hydroxyl group of the polyhydric alcohol is substituted by a higher molecular weight acyl radical.

9. A derivative of a lower molecular weight aliphatic polyhydric alcohol, in which the hydrogen of at least one hydroxyl group is substituted by the group

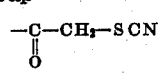

and a hydrogen of at least one hydroxyl group of the poly-hydric alcohol is substituted by a higher molecular weight acyl radical.

10. A derivative of a lower molecular weight poly-hydric alcohol, the hydrogen of at least one hydroxyl group of which is substituted by the group

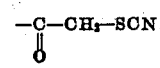

and a hydrogen of at least one hydroxyl group of the polyhydric alcohol is substituted by a higher molecular weight aliphatic radical of the group consisting of alkyl and acyl radicals and containing from twelve to eighteen carbon atoms.

11. A derivative of a lower molecular weight tri-hydric alcohol, the hydrogen of at least one hydroxyl group of which is substituted by the group

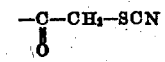

and a hydrogen of at least one hydroxyl group of the tri-hydric alcohol is substituted by a straight chain higher molecular weight aliphatic radical of the group consisting of alkyl and acyl radicals and containing between twelve and eighteen carbon atoms.

12. A chemical compound in the form of a thiocyano-acetic acid ester of a lower molecular weight trihydric alcohol and corresponding to the formula

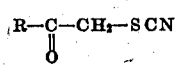

wherein R is the lower molecular weight trihydric alcohol radical in which the hydrogen of at least one hydroxyl group is substituted by a higher molecular weight acyl radical.

13. A carboxylic ester of a relatively low molecular weight thiocyano-fatty acid with one thiocyano group, wherein the radical esterified with the thiocyano-fatty acid is a glycol radical containing a high molecular weight straight chain acyl radical.

14. A carboxylic ester of thiocyano-acetic acid, wherein the radical esterified with the thiocyano-acetic acid is a glycol radical containing a high molecular weight straight chain acyl radical.

15. A carboxylic ester of thiocyano-acetic acid, wherein the radical esterified with the thiocyano-acetic acid is a glycol radical containing an aliphatic radical of the group consisting of alkyl and acyl radicals and containing from twelve to eighteen carbon atoms.

16. A chemical compound represented by the general formula $$R-O-\underset{\underset{O}{\|}}{C}-X-SCN$$

wherein R is a lipophile group with at least eight carbon atoms in the form of a derivative of an aliphatic polyhydroxy substance, and X is the carbon-hydrogen residue of the thiocyano-fatty acid, wherein X contains less than eight carbon atoms.

17. A chemical compound represented by the general formula $$R-O-\underset{\underset{O}{\|}}{C}-CH_2-SCN$$

wherein R is a lipophile group containing between twelve and eighteen carbon atoms.

18. A chemical compound having the general formula $$R-COO-R_1$$

in which R denotes an aliphatic radical, containing up to seven carbon atoms and at least one thiocyanate radical, and $R_1$ is a radical of an aliphatic alcohol containing from twelve to eighteen carbon atoms.

19. A chemical compound having the general formula $$R-COO-R_1$$

in which R denotes an aliphatic radical, containing from one to three carbon atoms and at least one thiocyanate radical, and $R_1$ is a radical of an aliphatic alcohol containing at least twelve carbon atoms.

20. Esters of lower fatty acids and aliphatic alcohols containing at least twelve carbon atoms, said esters containing a thiocyanate group in the alkyl portion of the acyl group of the ester molecule.

21. Esters of lower fatty acids and unsaturated aliphatic alcohols containing at least twelve carbon atoms, said esters containing a thiocyanate group on the alkyl portion of the acyl group of the ester molecule.

22. A process for the manufacture of new chemical compounds which comprises esterifying a member of the group consisting of higher molecular weight alkyl and acyl derivatives of an aliphatic polyhydroxy substance, which derivatives have at least one free hydroxy group attached to the polyhydroxy nucleus, with a lower molecular weight halogeno-fatty acid, and then reacting the resulting product with an alkali metal thiocyanate.

23. A process for the manufacture of new chemical compounds which comprises esterifying a member of the group consisting of higher molecular weight alkyl and acyl derivatives of an aliphatic polyhydroxy substance, which derivatives have at least one free hydroxy group attached to the polyhydroxy nucleus, with a halogeno-acetic acid, and then reacting the resulting product with an alkali metal thiocyanate.

ALBERT K. EPSTEIN.
BENJAMIN R. HARRIS.